US008230100B2

(12) United States Patent
Shukla et al.

(10) Patent No.: US 8,230,100 B2
(45) Date of Patent: Jul. 24, 2012

(54) VARIABLE FIDELITY MEDIA PROVISION SYSTEM AND METHOD

(75) Inventors: Amol Shukla, Seattle, WA (US); Aaron James Colwell, Seattle, WA (US)

(73) Assignee: RealNetworks, Inc., Seattle, WA (US)

( * ) Notice: Subject to any disclaimer, the term of this patent is extended or adjusted under 35 U.S.C. 154(b) by 306 days.

(21) Appl. No.: 12/181,316

(22) Filed: Jul. 28, 2008

(65) Prior Publication Data

US 2009/0030976 A1    Jan. 29, 2009

Related U.S. Application Data

(60) Provisional application No. 60/952,031, filed on Jul. 26, 2007.

(51) Int. Cl.
*G06F 15/16* (2006.01)

(52) U.S. Cl. ...................................................... 709/231

(58) Field of Classification Search .................... 709/231
See application file for complete search history.

(56) References Cited

U.S. PATENT DOCUMENTS

| | | | |
|---|---|---|---|
| 6,327,364 B1 * | 12/2001 | Shaffer et al. ............ 379/265.02 |
| 2002/0126990 A1 * | 9/2002 | Rasmussen et al. ............ 386/68 |
| 2002/0156893 A1 * | 10/2002 | Pouyoul et al. ............... 709/225 |
| 2002/0196741 A1 * | 12/2002 | Jaramillo et al. ............. 370/252 |
| 2003/0007515 A1 * | 1/2003 | Apostolopoulos et al. ... 370/503 |
| 2003/0068043 A1 * | 4/2003 | Tam et al. ..................... 380/236 |
| 2006/0056455 A1 * | 3/2006 | Floriach et al. ............... 370/469 |
| 2006/0248209 A1 * | 11/2006 | Chiu et al. .................... 709/231 |
| 2009/0106393 A1 * | 4/2009 | Parr et al. ..................... 709/218 |
| 2009/0116668 A1 * | 5/2009 | Davidson ..................... 381/119 |

* cited by examiner

*Primary Examiner* — William Goodchild
(74) *Attorney, Agent, or Firm* — Æon Law; Adam L. K. Philipp

(57) ABSTRACT

A layered media stream may be distributed via a managed server and a peer-to-peer (P2P) network. At least one base layer typically provides a lower-quality media stream, while one or more enhancement layers provide improvements to the media stream. A managed server may provide a base layer to clients. The managed server may also provide enhancement layers through the P2P network. The availability of the enhancement layers may provide clients with an incentive to participate in the P2P network. In some cases, when demand for the media stream is low, the managed server may provide all layers to clients in a traditional client-server network model. When demand for the media stream is high, the managed server may provide only the base layer, making enhancement layers available via the P2P network.

44 Claims, 12 Drawing Sheets

VARIABLE FIDELITY MEDIA PROVISION SYSTEM AND METHOD

FIELD

This invention relates generally to variable fidelity digital information, and more specifically, to systems and methods for providing variable fidelity media over peer to peer ("P2P") networks.

BACKGROUND

The number of devices capable of playing media is growing at a staggering rate. Virtually all modern personal computers and many modern cell phones, personal digital assistants, personal media players, set-top boxes, game consoles, and even refrigerators are capable of media playback. Such disparate devices can differ widely in their memory and processing capabilities, screen sizes, power consumption restraints, and available communications bandwidth. Such devices may receive media for playback via any number of communications technologies, including cable and DSL, fiber to the home, Wi-Fi, BlueTooth, 2.5G and 3G mobile phone networks, and the like.

Now that consumers have so many different connected media playback devices, many wish to be able to access all of their content at any time, from anywhere. But at the same time, few consumers wish to educate themselves about the technical details of their communications interfaces or device constraints.

One approach has been to encode, store, and select from multiple versions of each piece of media to provide a version appropriate to provide to a particular client device. For example, many websites offering streaming media allow a user to select between a low-bandwidth, low-quality encoding and a higher-bandwidth, higher-quality encoding. Similarly, services such as the iTunes Music Store, operated by Apple Inc. of Cupertino, Calif., sometimes let users choose between a lower-bandwidth, lower-quality encoding and a higher-bandwidth, higher-quality encoding of a particular piece of media. This approach is burdensome in part because it is often difficult for a content provider to ascertain the playback capabilities of any particular playback device, yet in most cases, the consumer is also unwilling or unable to ascertain and provide such information.

Another approach to the problem has been to encode each piece of media into multiple independent streams at varying bitrates, then switching between those streams to address varying bandwidth capacities. Technologies such as SureStream, developed by Real Networks of Seattle Wash., take such an approach, monitoring delivery rates and attempting to predict which bitrate stream to deliver as network capacity varies over time. Still, this approach is complex to implement and addresses only the bandwidth dimension of the differences between playback clients.

A better solution may be to utilize variable-fidelity media, encoding each piece of media a single time into a base layer and a set of additive layers that enhance the quality, size, or other attributes of the base layer. In some cases, one or more additive layers may also be independently renderable.

According to the concept of variable fidelity, scalable, or layered media, a piece of media or a presentation comprising multiple pieces of media is split up into a set of layers, each layer containing information that builds on top of one or more of the layers below it.

Layered media or layered presentations have become commonplace in certain contexts, while remaining obscure in others. One simple example of a commonly encountered form of layering is a web page that may comprise a base layer (e.g., basic text and html layout information) and one or more enhancement layers, for example a CSS style sheet layer, a scripting layer, and/or one or more media layers (e.g., individual image files). A client device may choose to display some or all of these layers, depending on the capabilities of the client and/or network conditions. For example, a mobile phone browser may obtain and display only the base text layer, whereas a desktop computer web browser may obtain and display all layers. For another example, a client device may disable bandwidth-heavy media layers when using a slow network connection.

Many audio and video compression/decompression ("codec") specifications include support for scalable or layered modes, although few scalable modes are in common usage. For example, the MPEG-2 standard defines several profiles that include support for signal-to-noise ratio ("SNR") and/or spatial scalable modes. For another example, the H.264 standard with the Scalable Video Coding extension defines profiles that provide for temporal, spatial, and SNR scalability. These three types of scalability have the following general characteristics:

Temporal scalability: media is coded at multiple frame rates (video) or sampling rates (audio). For example, a base layer may provide video encoded at 7.5 frames per second (FPS) video, while enhancement layers can be added to improve the frame rate to 15 FPS and 30 FPS.

Spatial scalability: video is coded at multiple spatial resolutions. For example, a base layer may provide video encoded at a resolution of 320×240, while multiple enhancement layers may increase the resolution to 640× 480 and 800×600.

SNR scalability: media is coded at multiple degrees of fidelity or clarity. For example, a base layer may provide audio encoded at 8 bits per sample, while enhancement layers increase the bit depth to 16 and 24 bits per sample.

P2P communication has become a popular method of sharing and obtaining digital media and other forms of digital information. In traditional client-server network models, a large number of clients generally make requests to a small number of centrally managed servers that deliver valuable information to the clients. By contrast, in the P2P network model, more or less equal peer nodes function both as "clients" and as "servers," simultaneously receiving valuable information from and providing valuable information to other peer nodes. On the Internet, P2P is often a transient Internet network that allows peer users with the same networking protocol to connect with each other and directly access files on the computers of other peer users. Peer computers and other Internet protocol (IP) based devices can be discovered using an indexing mechanism (either centralized or distributed).

For providers of large content files, such as audio, video, application suites, et al, the costs of providing sufficient bandwidth to meet consumer demand can be significant. As consumer broadband networks become faster and faster, it becomes feasible to deliver more and more types of content via the Internet. Indeed, in many cases, consumer network connections are fast enough to support real time streaming of long-form video content, such as television shows and feature films. Indeed, numerous companies have recently introduced on-demand video streaming services.

For such companies, managing bandwidth demands can be challenging. For example, bandwidth demands may be relatively modest on weekdays, but may rise dramatically on the weekends, and may periodically spike with the introduction of a new piece of popular content. One advantage of P2P network models is that bandwidth availability should vary directly with the popularity of a given piece of content at a given time, since the more popular a piece of content is, the more peers there will be hosting that content.

As a general rule, a consumer may have some incentive to absorb part of the cost of content distribution via a P2P network. At the present time, that incentive often takes the form of "free" access to commercial content across P2P file sharing networks of dubious legality. In the case of such file sharing P2P networks, many consumers have proven that they are happy to exchange a portion of their bandwidth capacity in exchange for virtually unlimited access to popular media files. However, such P2P file sharing networks often bypass content owners and distributors completely. Few completely "legitimate" businesses have thus far built revenue models around P2P network models.

Commercial content providers that currently use a client-server model for media distribution include YouTube, operated by Google Inc. of Mountain View, Calif., the iTunes media store, operated by Apple Computer Inc. of Palo Alto, Calif., Amazon Unbox, operated by Amazon.com Inc. of Seattle, Wash., et al.

There are fewer commercial content providers that use a P2P network model. Some of the more prominent P2P content providers include Vudu, Inc. of Santa Clara, Calif., which produces the Vudu box interactive media device, and several vendors of software-only media players, such as Joost, made by Joost N.V. of Luxembourg, Luxembourg, and Veoh, made by Veoh Networks, Inc. of San Diego, Calif. The last, Veoh, actually operates both using a client-server network model and a P2P network model. Low quality media may be streamed via the Veoh.com website from a centrally managed server. Higher quality media is available via a standalone P2P software application. Thus, the Veoh model gives consumers a binary choice: view low quality video with no participation in the P2P network or view high quality video by participating fully in the P2P network.

At the moment, one incentive consumers have to participate in such P2P networks is likely the relative novelty of obtaining high-quality, legal, streaming media via a personal computer or set top box. As streaming media applications become more mainstream, and the novelty consequently wears off, it may be that consumers will drift towards client-server models. Another problem with such P2P streaming media applications is the relative scarcity of disk space on the peer devices. For example, while a dedicated, centrally managed server may have terabytes of on-line storage dedicated to storing media files for streaming, a typical P2P client may have far less free disk space, perhaps 10 GB or less. Consumers may be reluctant to allow a P2P streaming media client to utilize their hard drives to store large amounts of media to be shared with other P2P clients.

BRIEF DESCRIPTION OF THE DRAWINGS

The present invention will be described by way of exemplary embodiments but not limitations, illustrated in the accompanying drawings in which like references denote similar elements, and in which.

DESCRIPTION

Figure 1:
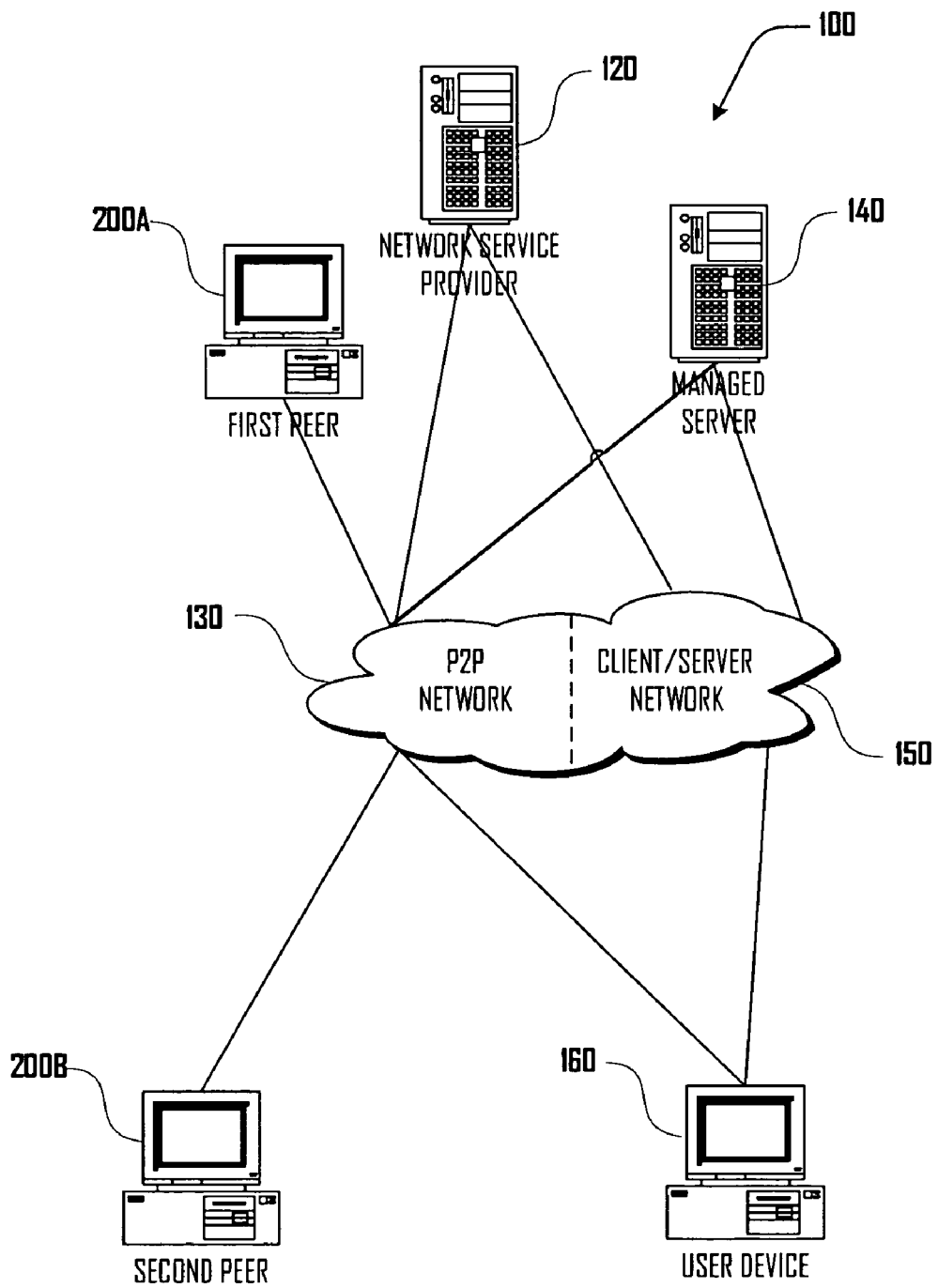
FIG. 1 is a pictorial diagram of a system of interconnected devices that provide variable fidelity media in accordance with various embodiments.

Illustrative embodiments of the present invention include, but are not limited to, systems and methods providing variable fidelity media over a P2P network.

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Further, various operations and/or communications will be described as multiple discrete operations and/or communications, in turn, in a manner that is most helpful in understanding the present invention; however, the order of description should not be construed as to imply that these operations and/or communications are necessarily order dependent. In particular, these operations and/or communications need not be performed in the order of presentation.

The phrase "in one embodiment" is used repeatedly. The phrase generally does not refer to the same embodiment; however, it may. The terms "comprising," "having" and "including" are synonymous, unless the context dictates otherwise.

In the audio/video context, the promise of layered media codecs has remained largely unrealized. However, when layered media delivery is combined with another rapidly growing technology—P2P networks—significant benefits may be realized.

P2P network models could potentially be utilized by high-bandwidth content providers to minimize bandwidth costs and/or to provide "overflow" capacity for periods of peak usage of popular files. Bandwidth costs can be minimized because centrally managed servers need serve only a handful of clients, each of which in turn propagates the stream to more downstream clients. However, while the potential benefits of a P2P network model for content providers is relatively clear, it is less clear that consumers will be willing to participate in such networks because P2P file distribution essentially shifts some or all of the bandwidth costs from the distributor or content provider to the individual consumer, who must use at least some of his or her "upstream" bandwidth to provide information to other peers on the network. In other words, P2P network models impose a "cost" on the consumer in that the consumer must share a portion of his or her network bandwidth to upload data to other peers on the P2P network. By contrast, a consumer obtaining content from a client-server network model need not share any bandwidth with other peers.

Layered media streams may be distributed according to several different schemes, including via a traditional client-server model, via a distributed managed server, via a traditional P2P network, and/or via a "hybrid" client/server/P2P network, which utilizes a managed server or a distributed managed server in conjunction with a P2P network. A distributed managed server is characterized in that the "server" may be provided by a distributed network of secure and often clustered distribution peers, similar to the networks operated by Google, Akamai, Amazon, and the like. A distributed server system is in some ways similar to a P2P network, though membership as a distribution peer is centrally controlled, data replication may be more formally controlled, and the peers may utilize an inwardly facing private network and an outwardly facing proxy (including a distributed proxy network) so as to appear as one logical server. References herein to "server" and "managed server" should be understood to include a distributed managed server unless the context indicates otherwise.

In accordance with one embodiment, a layered media stream may be distributed via a managed server and a peer-to-peer (P2P) network. At least one base layer typically provides a lower-quality media stream, while one or more enhancement layers provide improvements to the media stream. In an alternative embodiment, a low-quality media stream (one adapted for display on a portable or other device with limited display) may be an enhanced layer in relation to one or more base layers of higher quality. A managed server may provide a base layer to clients in a traditional client-server network model and/or through the P2P network (either by acting as a distribution peer or by seeding to a distribution peer). The managed server may also provide enhancement layers through the P2P network (again, either by acting as a distribution peer or by seeding a distribution peer). The availability of the enhancement layers may provide clients with an incentive to participate in the P2P network and share in the distribution and storage costs for the enhancement layers.

One or more conditions may be placed on the distribution of a base and/or enhancement layer, including requiring that the requesting device participate in the P2P network as a distribution peer, that the requesting device maintains a distribution peer, and/or that the requesting device has paid for access.

In accordance with an alternate embodiment, a variable load of distributing a layered media stream may be balanced via a managed server and a peer-to-peer (P2P) network. A base layer typically provides a lower-quality media stream, while enhancement layers provide improvements to the media stream. When demand for the media stream is low, the managed server may provide all layers to clients in a traditional client-server network model. When demand for the media stream is high, or as a general practice, the managed server may provide only the base layer, making enhancement layers available via the P2P network.

FIG. 1 illustrates an exemplary embodiment of a number of devices used in an exemplary system 100. The system 100 includes a first peer 200A, and a second peer 200B, which each participate in a P2P network 130. Additionally the system includes a managed server 140, which may act not only as a server on a client/server network 150, but also as a peer and/or distribution peer on the P2P network 130. A user device 160, may act as a client on the client/server network 150 and as a peer on the P2P network 130. As discussed further, for example, in relation to FIG. 4, peers in the P2P network 130 may act as distribution peers.

It will be appreciated by one of ordinary skill in the art that there can be a plurality of peer devices 200*a-b*, P2P networks 130, managed servers 140, networks 150, and/or user devices 160. Moreover, one or more of these devices or networks can be absent in various embodiments.

In one exemplary embodiment, the first and second peer devices 200A-B, the managed server 140, and user device 160 can store media, which may be shared with peers participating in the P2P network 130 and/or with clients on the network 150. For example, user device 160 can query the P2P network 130 (or the managed server 140) and compile a list of available media that is stored on the devices or servers participating in the P2P network 130, and then select desired media to download from one or more device or server that store the selected desired media.

In another exemplary embodiment, the first and second peer device 200A-B, the managed server 140, and user device 160 can store layered media or layers of layered media, which can be shared with other peers participating in the P2P network 130 or to clients on the client/server network 150.

In one embodiment, a network service provider 120, or other intermediary such as a DNS server, a proxy server, a P2P manager, a special-purpose packet sniffer, or another network service component performs certain functions, such as measuring demand on the managed server 140, and may be utilized, either acting on its own or under the direction of the managed server 140, to direct requests from the managed server 140 to rendering devices 200 and/or peers 110.

In various embodiments, managed server 140 may act as a P2P indexing server (i.e., a "tracker"). Indexing servers typically provide centralized services such as content and peer indexing. As such, they may serve as a repository for control information in the network. They can optionally collect accounting and playback information from the peers. In various embodiments, managed server 140 may also act as a managed seed on a P2P network. Such a managed seed may not only introduce new content into the network, but may also continue uploading and supporting a subset of peer requests in order to meet quality of service requirements (e.g., target delivery rate). Additionally, managed seeds may help ensure steady content availability and help minimize startup and switch latencies. Techniques such as seed masquerading may be used in conjunction with upload incentives to encourage clients to download from other peers instead of the managed seeds.

Figure 2:
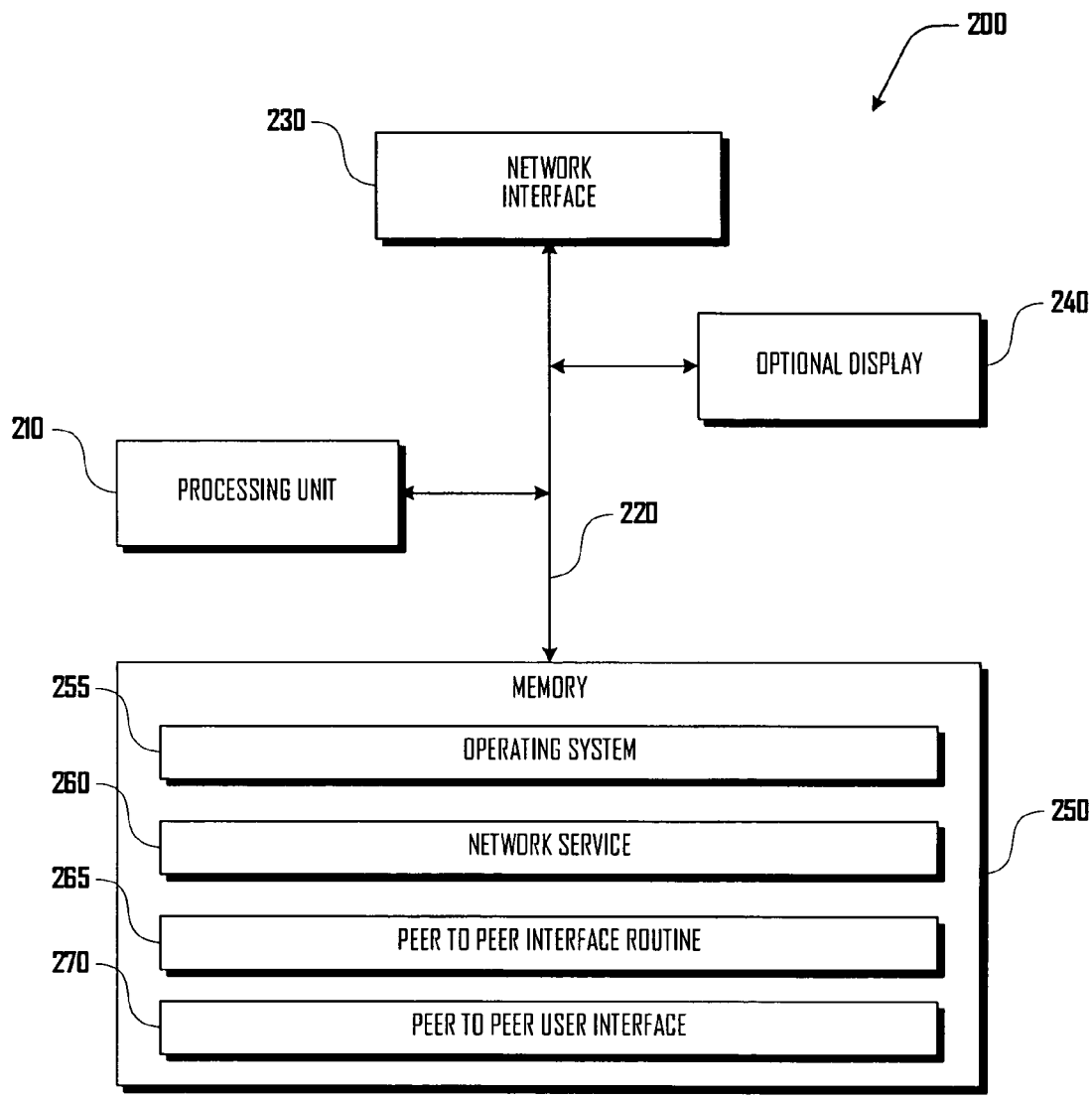
FIG. 2 is a block diagram of a peer device that provides an exemplary operating environment in accordance with various embodiments.

FIG. 2 illustrates several components of a peer device 200. Those of ordinary skill in the art and others will appreciate that the peer device 200 may include many more components than those shown in FIG. 2. However, it is not necessary that all of these generally conventional components be shown in order to disclose an enabling embodiment. As shown in FIG. 2, the peer device 200 includes a network interface 230 for connecting to remote devices (e.g., user device 160). The network interface 230 may be a network interface designed to support a local area network (LAN), wireless local area network (WLAN), personal area network (PAN), telephone network, powerline connection, serial bus, universal serial bus (USB) wireless connection, or the like. The network interface 230 includes the necessary circuitry, driver and/or transceiver for such a connection and is constructed for use with the appropriate protocols for such a connection.

The peer device 200 also includes a processing unit 210, an optional display 240 and a memory 250, all interconnected along with the network interface 230 via a bus 220. Those of ordinary skill in the art and others will appreciate that the display 240 may not be necessary in all forms of computing devices and, accordingly, is an optional component. The memory 250 generally comprises random access memory ("RAM"), a read only memory ("ROM") and a permanent mass storage device, such as a disk drive, flash RAM, or the like. The memory 250 stores the program code necessary for a P2P interface routine 265 and a P2P user interface 270. Additionally, the memory 250 stores an operating system 255 and a network service 260.

It will be appreciated that the software components may be loaded from a computer readable medium into memory 250 of the peer device 200 using a drive mechanism (not shown) or network mechanism (not shown) associated with the computer readable medium, such as a floppy, tape, DVD/CD-ROM drive, flash RAM, or network interface card.

Although an exemplary peer device 200 has been described that generally conforms to conventional general-purpose computing device, those of ordinary skill in the art will appreciate that a peer device 200 may be any of a great number of devices capable of functioning as a P2P device and connecting with another peer device. For example, a peer device 200 may be a mobile phone, personal digital assistant, set-top box, game console, portable media player, personal computer, or the like.

In one exemplary embodiment, the P2P user interface 270 is a graphical user interface. An example of a graphical user interface is an interactive web page, e.g., in HTML (HyperText Markup Language), Flash, JavaScript, VBScript, JScript, PHP (HTML Preprocessor), XHTML (extensible HyperText Markup Language) form, or the like. Resultantly, since users are generally familiar with the user interfaces of web pages, including sophisticated web pages such as Flash-enabled web pages from Adobe, of San Jose, Calif., consumption of P2P device services using a web page based graphical user interface on a P2P device 200 (e.g., displayed on the P2P display 240) may be made familiar and user friendly. In an alternate embodiment, the P2P user interface 270 may be a part of a stand-alone media player application (not shown).

Figure 3:
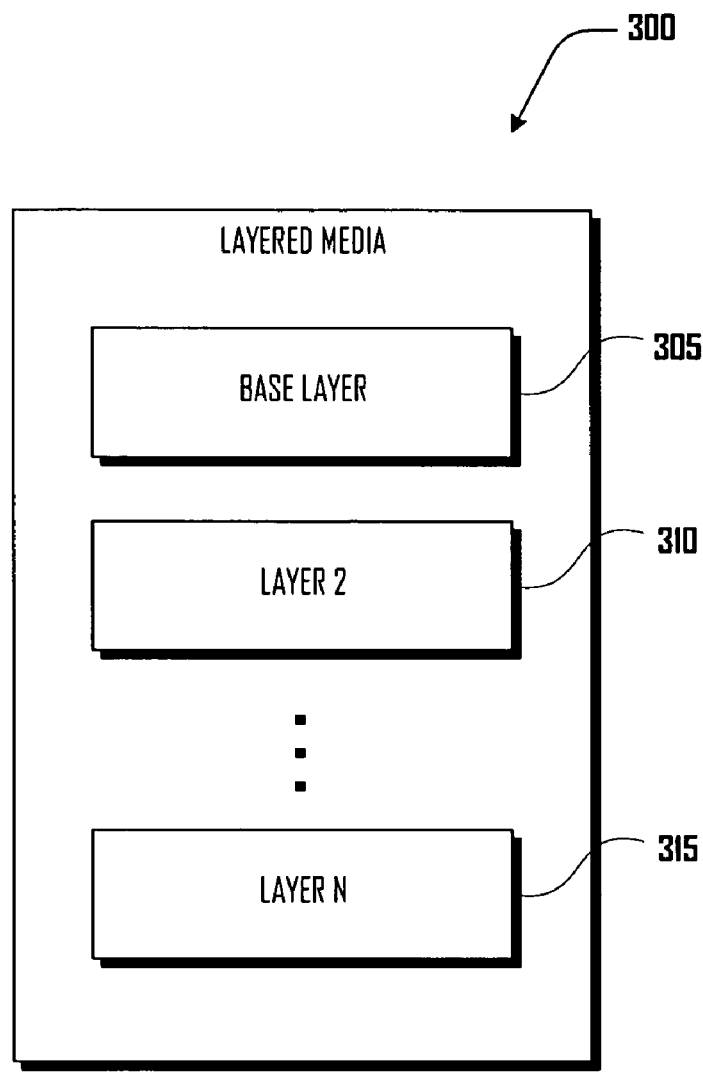
FIG. 3 is a diagram illustrating a layered media stream in accordance with various embodiments.

As illustrated in FIG. 3, layered media 300 can comprise a plurality of fidelity levels, including a base layer 305, a secondary layer 310, and zero or more additional layers 315. A piece of layered media 300 can be stored as a set of distinct files, each corresponding to a particular layer, as a single file encapsulating all layers, or as some combination of these two extremes. A base layer typically provides a low-quality media stream by itself. Often a base layer 305 standing alone provides a valid, typically low quality, bitstream for a decoder. But a base layer 305 may also require the presence of at least one additional layer 310-15 to be a valid bitstream. However, as used herein, the term "base media content stream" refers to a media content stream that is independently renderable (i.e., it is a valid media bitstream without reference to any additional layers). In other embodiments, there may be multiple independent base layers.

Moreover, a base layer may exhibit an adaptive window length, wherein the length of a base layer may change during the transmission of a media streaming event.

Subsequent layers 310-15 typically provides additional temporal, spatial, or "quality" information which, when combined with other layers, provides higher fidelity or more accurate reproduction of the originally encoded information. Standing alone, such "enhancement" layers may not provide a valid bitstream for a decoder. However, in some embodiments, an enhancement layer may provide a valid bitstream in and of itself, potentially with higher or lower fidelity relative to the layer's base layer. Accordingly, as used herein, the term "improvement," when used in regards to a media stream, means changing one valid media bitstream to another valid media bitstream, wherein the "improved" media bitstream has some different characteristic, such as a higher or lower resolution, higher or lower bitrate, and the like.

Taking the example of video media, the base layer 305 may provide basic video at low resolution and subsequent layers 310-15 may provide enhancements to the video, such as added audio, increased resolution, or increased video quality obtained from increased bit-depth and/or improved signal-to-noise ratio. Additional layers may also provide an improved encoding format or may increase the frame-rate of the video. Similarly, an additional layer for an audio file may provide higher quality by increase the sampling rate, the bit-depth, the encoding format, and the like.

In various embodiments, the concept of layered media can be applied to any media with variable fidelity, including, but not limited to video, audio, images, text, stock quotes, webpage display and content, e-mail, ringtones, or the like. Additionally, it will be apparent to those skilled in the art that all types of media and variable fidelity media are within the scope and spirit of various embodiments, including, but not limited to media with layered coding (or scalable coding), multiple description coding, hybrid layered and multiple description coding, or the like.

Figure 4:
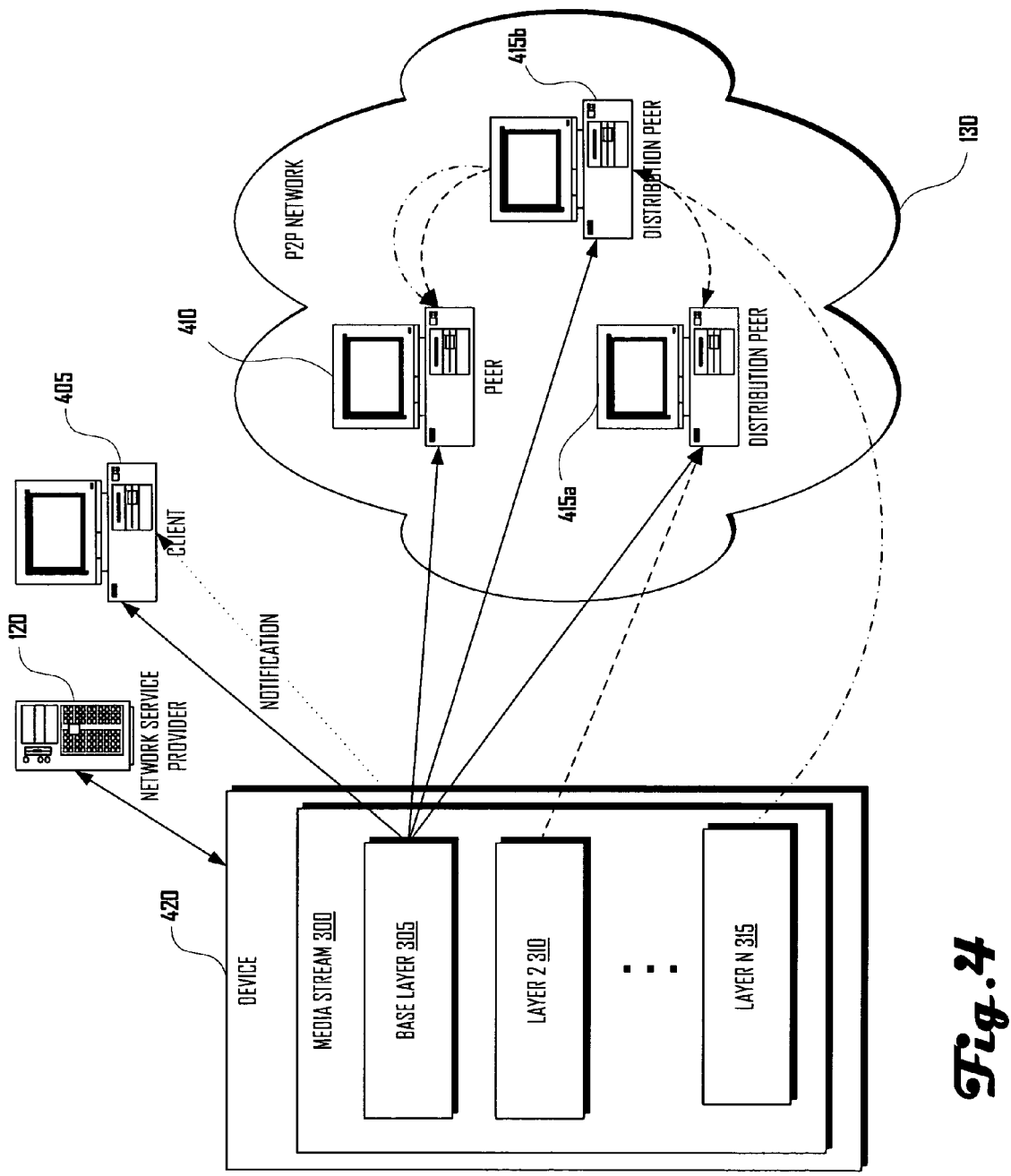
FIG. 4 is a pictorial diagram of a media stream being provided by a hosting device in accordance with various embodiments.

FIG. 4 illustrates one exemplary embodiment, wherein a layered media stream 300 is distributed via a hosting device 420 and a P2P network 130. The layered media stream 300 is hosted on a hosting device 420. The hosting device 420 distributes the base layer 305 to requesting devices, including one or more peers 410, 415 that participate in a P2P network 130, and including one or more clients 405 (which do not participate in the P2P network 130). Thus, the base layer is distributed by the hosting device 420 to requesting devices without regard for their level of participation in the P2P network 130. The hosting device 420 also distributes one or more additional layers 310-15, but, for example, only to requesting devices that participate in the P2P network 130 as distribution peers 415a-b. A distribution peer 415 is a device that fully participates in the P2P network 130, not only receiving files and/or layers from other distribution peers 415, but also making files and/or layers available to other peers 410-15 on the P2P network 130. In contrast to a distribution peer 415, a non-distribution peer 410 only partially participates in the P2P network 130, receiving files and/or layers from distribution peers 415, but not making files and/or layers available to other peers in the P2P network 130.

For example, the hosting device 420 may distribute Layer 2 310 to a first distribution peer 415a. The first distribution peer 415a may then re-distribute Layer 2 310 to a second distribution peer 415b, which may further distribute Layer 2 to a non-distribution peer 410. The managed server 140 may also notify non-peer client devices 405 that additional layers are available to distribution peers. Thus, by making additional layers 310-15 available only to distribution peers, the hosting device 420 provides an incentive for requesting devices to share in the distribution and/or storage cost of the additional layers 310-15.

In terms of storage, layers of layered media, whether base, enhancement or combinations thereof, may be stored separately or together on one or more peers and/or distribution peers in P2P networks and/or in managed servers and/or distributed managed servers, and/or in combinations thereof. Criteria may be used by a server, by a client, a peer, or by another device, such as a network service provider 430, to delete or retain or to direct the deletion or retention of one or more layers. Criteria which may be used to preferentially retain or delete a layer or layers may include one or more of the following (or combinations thereof): a passage of time, a local, regional, or network storage space threshold, the expiration of a time limit or a limit on the number of renderings associated with a layer or layers, a rendering quality of the layer, a rendering ability of the peer or peers with which a peer exchanges data, a terminal condition of the peer, demand for a particular content instance and/or a layer thereof, availability of a particular content instance and/or a layer thereof (as may be measured by absolute availability, by access latency, or by other measures of availability within a P2P network), the memory required to store a layer, the processing required to render a layer, whether the layer is capable of being independently rendered, whether the layer is an enhancement layer, a priority level associated with the layer, assignment or reassignment of a file and/or memory address associated with a layer or data associated with a layer, and/or whether license fees or other fees or costs are associated with retention of the layer (whether owed by the peer, by a provider of the content instance, or by another party).

In an alternate embodiment, hosting device 420 may also distribute additional layers 310-15 to non-peer client devices that have obtained a premium status by, for example, purchasing a subscription, having acted as a distribution peer in the past, or having performed some other desired act.

In one exemplary embodiment, one or more layer of layered media can be stored on one or more devices or servers connected to the P2P network 130. For example, the managed server 140 can store the base layer of a given piece of media, the secondary layer of the given piece of media can be stored on the first peer device 200a, and the tertiary layer of the given piece of media can be stored on the second peer device 200b. The user device 160 can download or stream the base layer from the hosting device 420, and also stream or download the secondary and/or tertiary layer from the first peer device 200a and second peer device 200b respectively, if the user desires to have higher fidelity for the given piece of media. Alternatively, the base level of a given piece of media can be stored on one or more peer device 200a-b and subsequent layers of the given piece of media (secondary, tertiary, etc.) can be stored on the hosting device 420. Prior to or following distribution by the managed server 140, one or more of the layers may be encrypted and/or encoded according to a Digital Rights Management ("DRM") scheme, with a decryption key or other access technology being provided by, with and/or as a layer, as discussed above.

In yet another exemplary embodiment the hosting device 420 can be used to "seed" peer devices 410-415 with layers of layered media and selectively provide layers of layered media to peers 410-15 participating in the P2P network 130. For example, the hosting device 420 can initially provide many layers 305-15 of a media stream 300 to peers 410-15 participating in the P2P network 130. Once a sufficient number of peers 410-15 participating in the P2P network 130 have collectively received the plurality of media layers of a media stream 300, the managed server 140 can cease providing one or more layers 310-15 of the media stream, can provide limited access to one or more layers 310-15 of the media stream, or can reduce the transfer rate limit for one or more layers 310-15 of the media stream 300. In another embodiment, the hosting device 420 can be absent, or the hosting device 420, when queried by a peer 410-15 participating in the P2P network 130, can disguise itself as a peer device instead of a managed hosting device 420. In a still further embodiment the P2P network 130 can be a centralized, decentralized, structured, unstructured, or hybrid P2P network, or the like.

In a still further embodiment, a network service provider 430, or other intermediary such as a DNS server, a proxy server, a P2P manager, a special-purpose packet sniffing or another network service component performs certain functions, such as measuring demand on the hosting device 420 and may be utilized, either acting on its own or under the direction of the hosting device 420, to direct requests from the hosting device 420 to the P2P network 130.

Figure 5:
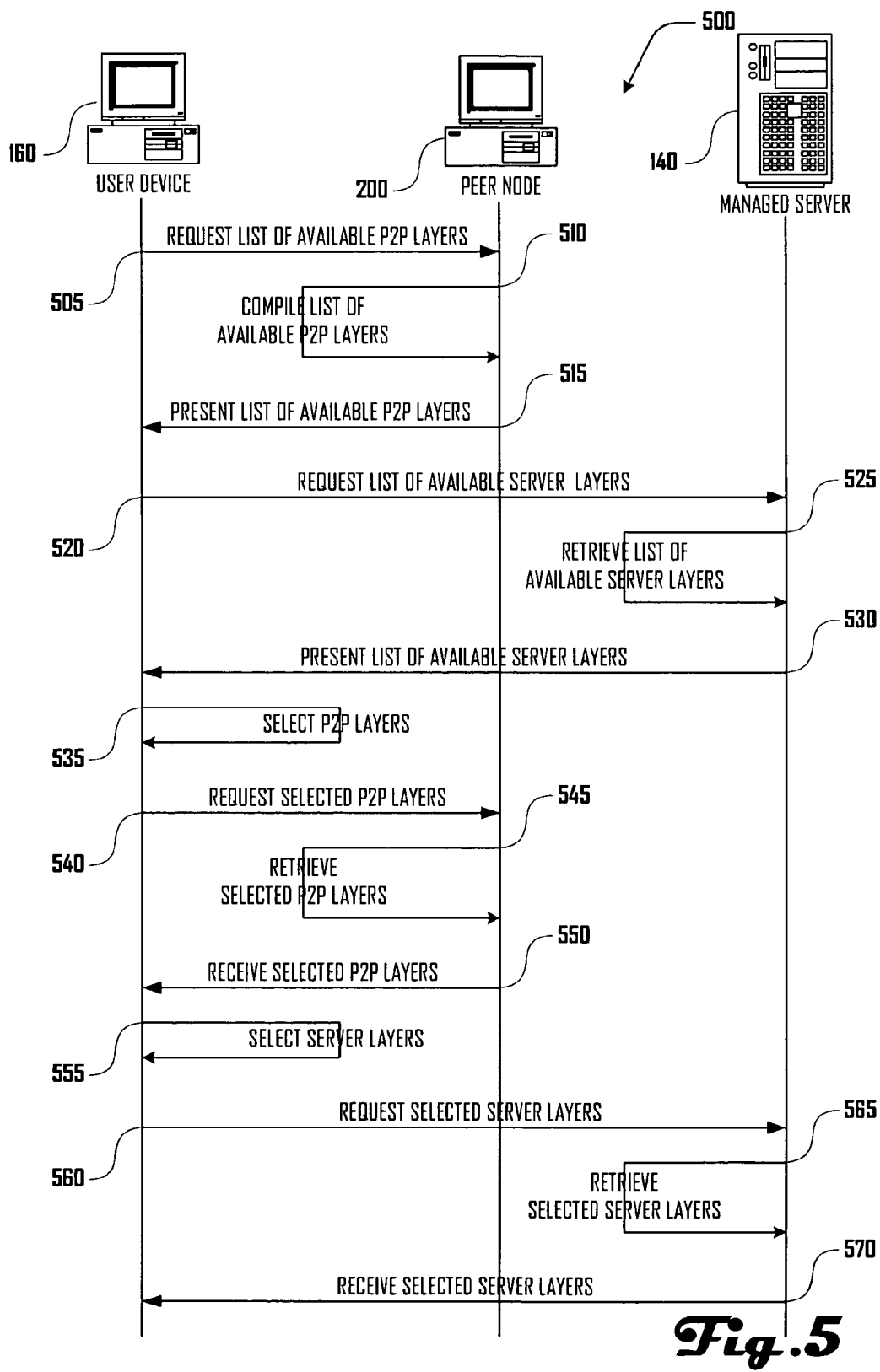
FIG. 5 is a diagram illustrating the actions taken by devices interacting with a P2P or hybrid network in accordance with various embodiments.

FIG. 5 is a diagram illustrating one exemplary series of communications between a user device 160, a P2P network 130 and a managed server 140, wherein the P2P network 130 comprises a plurality of peer devices 200. The communications begin with a request 505 for a list of available P2P media. The P2P network 130 compiles 510 a list of available media. The list of P2P media can be retrieved from the managed server 140 (centralized index) or by querying the peer network 130, as described (distributed index). The list of available server as well as peer media can comprise of any type of media including layers of layered media. The P2P network 130 then presents 515 the list of available P2P media.

Next the user device 160 requests 520 a list of server media from the managed server 140. The managed server 140 retrieves 525 a list of available server media and presents 530 the list of available server media.

Next, the user device 160 selects 535 P2P media and requests 540 the selected P2P media 540 from the P2P network 130. The selected P2P media is retrieved 545 from one or more of a plurality of peer devices associated with the P2P network 130, and the user device 160 receives 550 the selected P2P media. Next, the user device 160 selects 555 server media and requests 560 the selected server media from the managed media server 140. The selected server media is retrieved 565 from the managed media server 140, and the user device 160 receives 570 the selected server media.

As discussed herein, in some embodiments, the managed server 140 is absent. Additionally in further embodiments the managed server 140 does not provide or ceases to provide media and where the user device 160 requests a list of available server media 525, the managed server 140 would present a list of available media 530 that was a null set or would not present a list of available media or would redirect and/or refer the request to one or more peers in the P2P network. In still other embodiments, only the managed server 140 may be present, optionally masquerading as peer.

As further discussed herein, the managed server 140 could be disguised as or presented as a peer device 200 that is among the plurality of peer devices 200 that participate in the P2P network 130. Accordingly, when the user device 160 requests a list of available P2P media 505, and when the list of available P2P media is compiled 510, it will include media that is available from one or more managed servers 140, which may be disguised as or presented as a peer device that is among the plurality of peer devices that comprise the P2P network 130.

Figure 6:
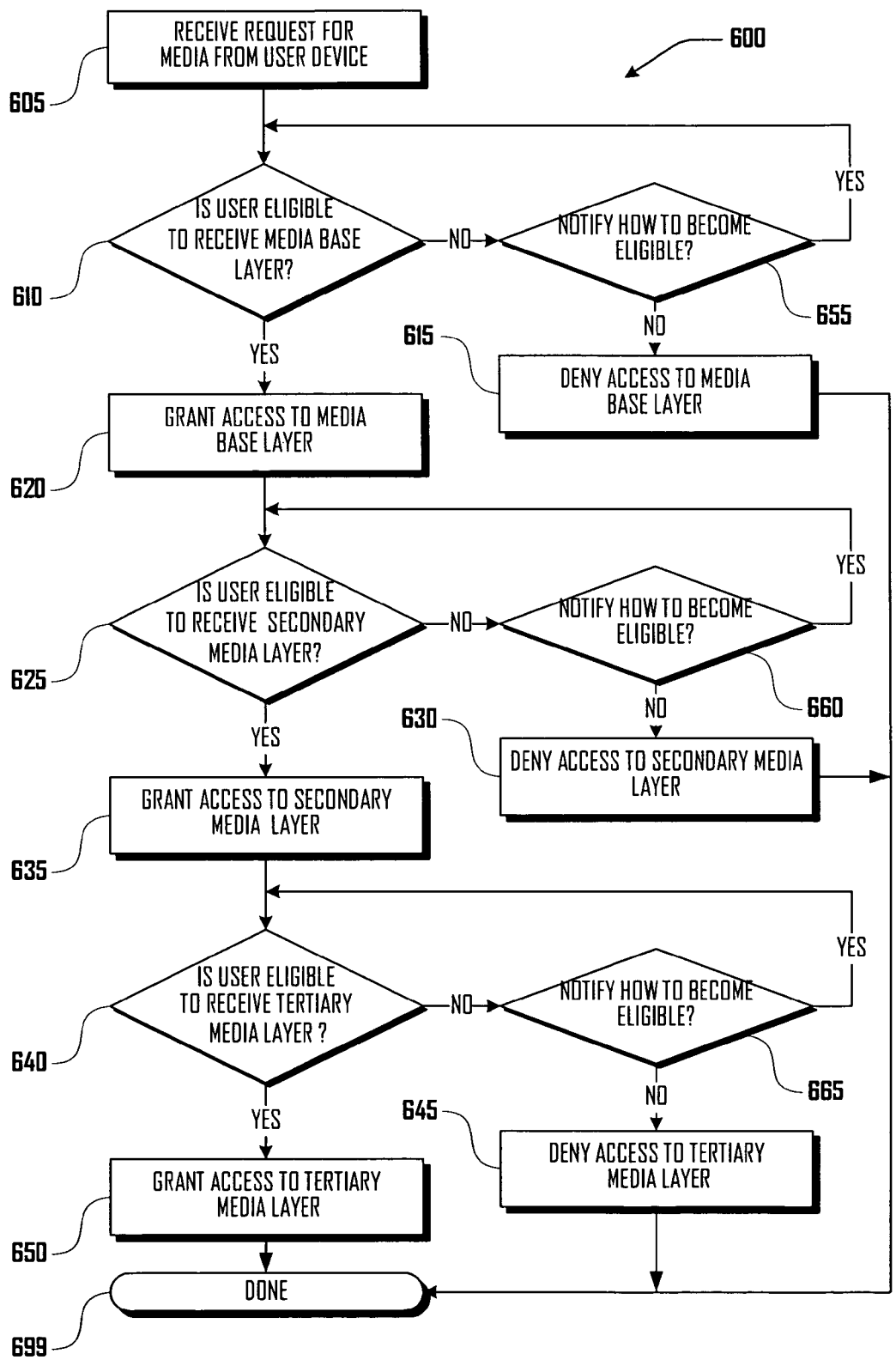
FIG. 6 is a flow diagram illustrating a routine for providing variable fidelity media over a P2P or hybrid network in accordance with various embodiments.

FIG. 6 is a flow diagram illustrating a routine 600 for providing variable fidelity media over a P2P network in accordance with various embodiments. The routine 600 for providing variable fidelity media over a P2P network begins at block 605 where a request for media is received from a device (e.g., a peer 200, user device 160, or the like). The routine continues to decision block 610, where a determination is made (either locally, by communicating with managed server 140, or by communicating out of band with an external server (not shown)) whether the user is eligible to receive the media base layer. (Eligibility criteria are discussed below.) If the user is not eligible to receive the media base layer, the routine continues to optional decision block 655, in which it is determined whether to notify the device of how to become eligible to receive the layer. If notification is to be made, notification is sent, and the routine re-evaluates the device's eligibility in decision block 610. If notification is not made (for example, because the device has been notified once already), the routine proceeds to block 615, where the user is denied access to the media base layer, and the routine is done 699. However, if the user is eligible to receive the media base layer, the routine continues to block 620, where the user is granted access to the media base layer.

The routine then continues to decision block 625 where a determination is made whether the user is eligible to receive the secondary media layer. (Eligibility criteria are discussed below.) If the user is not eligible to receive the media base layer, the routine continues to optional decision block 660, in which it is determined whether to notify the device of how to become eligible to receive the layer. If notification is to be made, notification is sent, and the routine re-evaluates the device's eligibility in decision block 625. If notification is not made (for example, because the device has been notified once already), the routine proceeds to block 630, where the user is denied access to the secondary media layer, and the routine is done 699. However, if the user is eligible to receive the secondary media layer, the process continues to block 635 where the user is granted access to the secondary media layer.

The routine then continues to decision block 640 where a determination is made whether the user is eligible to receive the tertiary media layer. (Eligibility criteria are discussed below.) If the user is not eligible to receive the media base layer, the routine continues to optional decision block 665, in which it is determined whether to notify the device of how to become eligible to receive the layer. If notification is to be made, notification is sent, and the routine re-evaluates the device's eligibility in decision block 640. If notification is not made (for example, because the device has been notified once already), the routine proceeds to block 645, where the user is denied access to the tertiary media layer, and the routine is done 699. However, if the user is eligible to receive the tertiary media layer, the process continues to block 650 where the user is granted access to the tertiary media layer and the routine is done 699.

For purposes of illustration, FIG. 6 depicts adaptive access control to layered media that consists of a base layer, a secondary layer and a tertiary layer. One ordinarily skilled in the art and others will immediately appreciate that the routine depicted in FIG. 6 can be adapted to other embodiments where layered media includes one or more layer.

Figure 7:
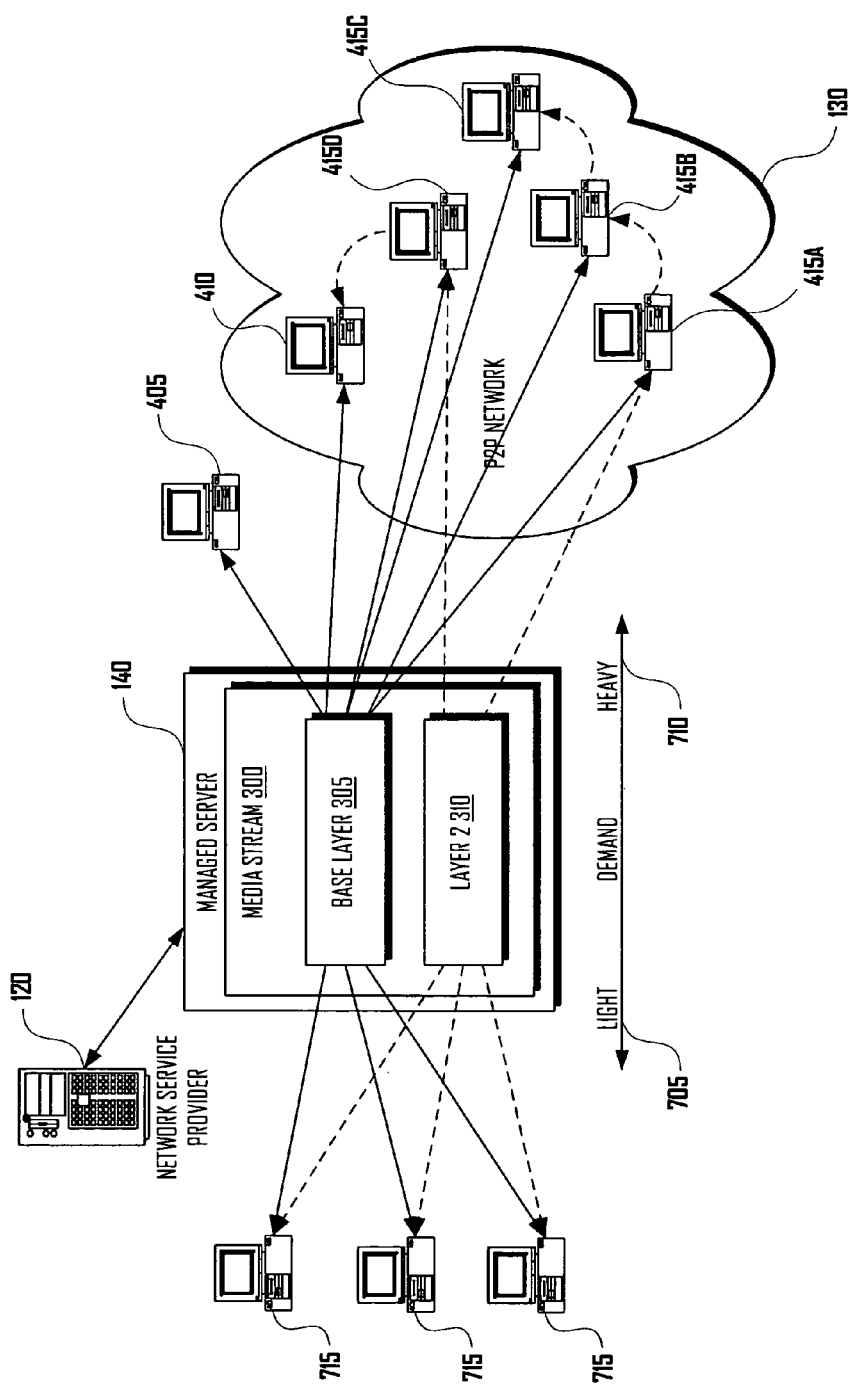
FIG. 7 is a pictorial diagram of a managed server using a hybrid network to balance varying demand loads in accordance with various embodiments.

Eligibility to receive a layer of a media stream can be determined by any combination of a multitude of factors, including, but not limited to server, peer, or network resource constraints. For example, in one embodiment, eligibility may be granted when the load on a server or distribution peer is low, but restricted when the load is high. As illustrated in FIG. 7, when demand on a managed server 140 is light, both the base layer 305 of a media stream 300 and additional layers 310 may be distributed to any requesting device 715. However, when demand is heavy 710, distribution of a secondary layer 310 may be restricted to a small number of distribution peers 415 A, D, which re-distribute the secondary layer 310 (directly or indirectly) to other distribution peers 415 B, C and/or peers 405. The base layer 305 may be distributed to all requesters regardless of load, as illustrated. In an alternate embodiment, distribution of the base layer 305 may be similarly restricted when demand is high 710.

Demand may be measured in any number of ways, including outgoing bandwidth compared to available bandwidth, a number of requests, a number of requesting devices, and the like. In one embodiment, the number of distribution peers 415 to which a secondary layer 310 is seeded decreases as demand increases, thereby allowing a manager server 140 to continue providing at least the base layer even when demand is high. However, if demand for a layer is high, then there will likely be a high number of distribution peers 415 participating in the P2P network, so a secondary layer may be available from more distribution peers 415 as demand for that layer increases.

For purposes of illustration, FIG. 7 depicts adaptive access control to layered media that consists of a base layer and a secondary layer. One ordinarily skilled in the art and others will immediately appreciate that the scenario depicted in FIG. 7 can be adapted to other embodiments where layered media includes one or more layer.

Referring again to eligibility in FIG. 6, in another embodiment, a system of points or credits gives a user eligibility to receive subsequent media layers when the user accumulates a defined number of points or credits. Points or credits can be gained or lost according to one or more factors, which can include, but are not limited to, number of media layers user makes available to other peer users, quality of media user makes available to other peer users, the amount of data a peer provides to other peers (which may be further weighted, for example, by the time at which the data was provided), the type of media user makes available to other peer users, payment, rating of peer users, purchase of specific goods or services, online purchase of a class of goods or services, specifications of the user's user device, for visiting and browsing defined webpages, for affiliation with groups or communities, either online or offline, or the like. Points, credits, or similar earned or paid for by or with respect to one user and/or device may be transferable or otherwise useable by another user and/or device.

Accordingly, such a system of provides natural incentives for P2P participation (i.e., including the user device 160 in the P2P network 130). By making the enhanced media layers available via the P2P network, peers have a natural incentive to participate if they want to improve their playback quality over the base level provided by the managed server 140 and/or simply to obtain access to and/or use of one or more layers. In various embodiments, a myriad of different criteria and combinations of criteria can be used to make a user eligible to receive subsequent layers of layered media, and all such criteria or combinations of criteria are within the scope and spirit of various embodiments. For example, in one non-limiting example, the managed server 140 may deliver the base and all enhanced layers to premium users while only delivering a base layer or enhancement layers to regular users, who then have to participate in the P2P network if they want to improve their content quality or to experience the content at all.

Figure 8:
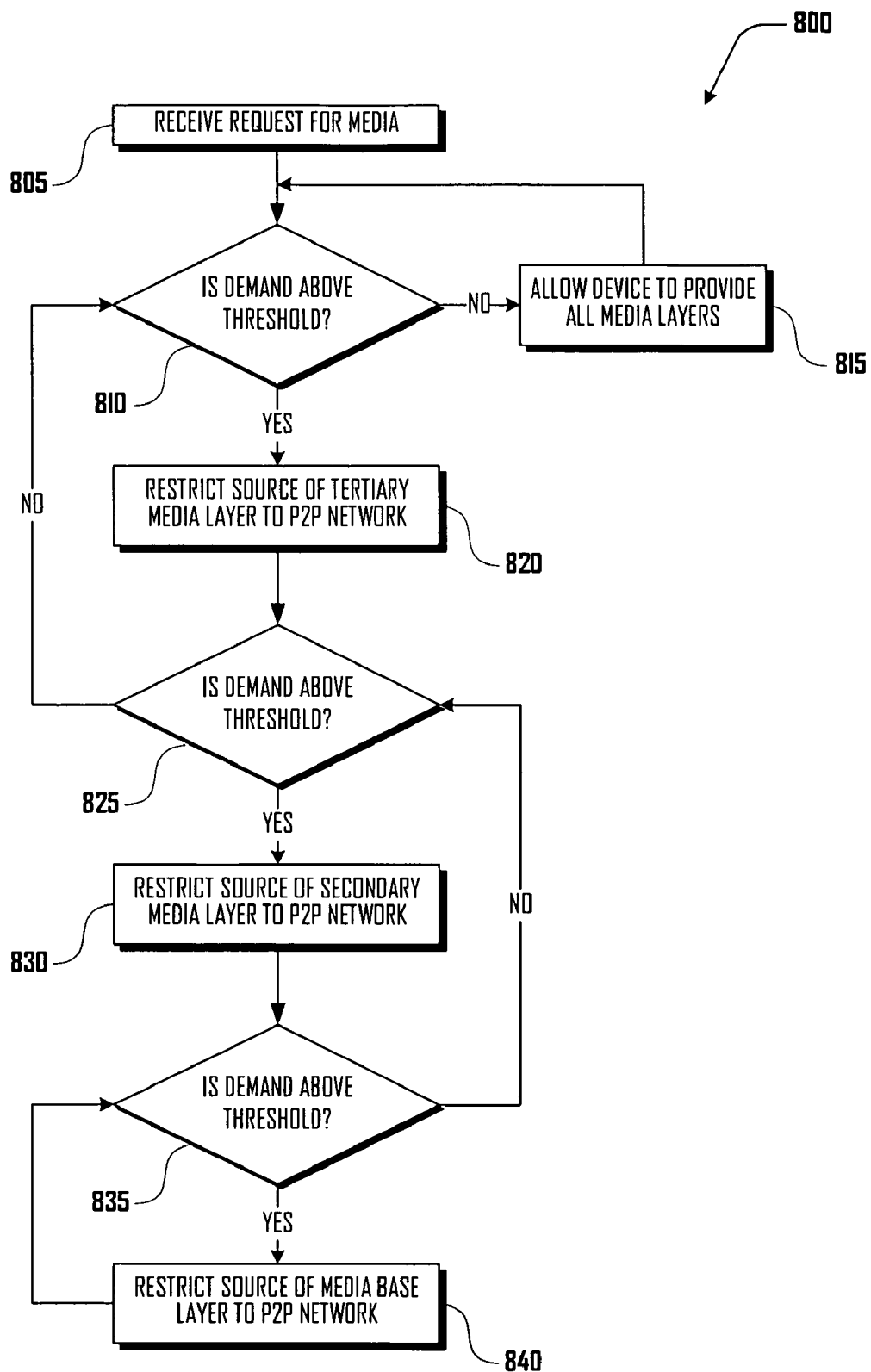
FIG. 8 is a flow diagram illustrating delivery of consistent media in response to variable media demand using variable fidelity media, in accordance with various embodiments.

FIG. 8 is a flow diagram illustrating a routine for load balancing, or providing consistent media content in response to variable media demand using variable fidelity media 800, in accordance with various embodiments. For purposes of illustration, FIG. 8 depicts access control to layered media that consists of a base layer, a secondary layer and a tertiary layer. One reasonably skilled in the art and others will immediately appreciate that the routine depicted in FIG. 8 can be adapted to other embodiments where layered media includes one or more layer.

The routine 800 depicted in FIG. 8 begins at block 805 where a device receives or creates a request for media. The routine continues to decision block 810, where a determination is made whether the demand for media is high. Demand may be measured on the client and/or server side and/or by an intermediary, such as a DNS server, proxy server, or other intermediate network component and/or network service provider 430. Demand may be measured in any number of ways, including outgoing bandwidth compared to available bandwidth, a number of requests, a number of requesting devices. Periods of high demand may be characterized by slow, delayed, or sub-standard layer deliveries. A demand threshold may be determined based on round trip times, ping times, packet loss statistics, and the like. If the demand is not too high, the routine continues to block 815, where the device is allowed to provide or request of a server all media layers, and the routine loops back to block 810 where a determination is again made whether the demand for media is too high. However, if the demand for media is above a determined threshold, the routine continues to block 820, where the source for tertiary media layers is restricted to the P2P network. In other words, the device will not provide or request of a server a tertiary media layer.

The routine then continues to decision block 825, where a determination is again made whether the demand for media is above a determined threshold. If the demand is not too high, the routine loops back to decision block 810, where a determination is again made whether the demand for media is above a determined threshold. However, if the demand for media is not too high, the routine continues to block 830, where the source for secondary media layers is restricted to the P2P network 130. In other words, the device will not provide or request of a server a secondary or tertiary media layer.

The routine then continues to decision block 835, where a determination is again made whether the demand for media is above a determined threshold. If the demand is not too high, the routine loops back to decision block 825, where a determination is again made whether the demand for media is above a threshold. However, if the demand for media does create a slow delivery rate, the routine continues to block 840, where the source for base layers is restricted to the P2P network 130. In other words, the device will not provide or request of a server a secondary, tertiary or base media layer. The routine then loops back to decision block 835 where a determination is again made whether the demand for media creates a slow delivery rate of media.

In one embodiment the routine 800 can be used to manage flash demand for content. For example, if a website suddenly is inundated with high traffic (such as when a specific website is featured on television, a major news events occur, or at a tax filing deadline) the server may not have enough bandwidth to handle the demand and all users visiting the website may expertise delayed content viewing or may not receive content at all. By using the routine depicted in FIG. 8, the server or client can gauge if traffic is causing an undesirable content delivery rate, and limit the content or quality of content that it will provide to users requesting content. However, media layers that provide more content or higher quality will still be available, but will be available from the P2P network 130, which can comprise users who are requesting content from the server.

In other words, if the demand for website content becomes too great and the server does not have sufficient bandwidth to efficiently provide all content, the peers who are requesting the content can selectively receive and/or request and/or be redirected to request it from other peers. For example, if demand becomes too great, content such as videos would not be provided by the server and would instead be provided by the P2P network of users. Additionally, if demand is still too great, content such as images would also not be provided by the server and would instead be provided by and/or requested from the P2P network of users. In one embodiment, when a demand condition is high, a DNS server may redirect to an alternate device and/or to the P2P network requests made to a managed server 140.

Figure 9:
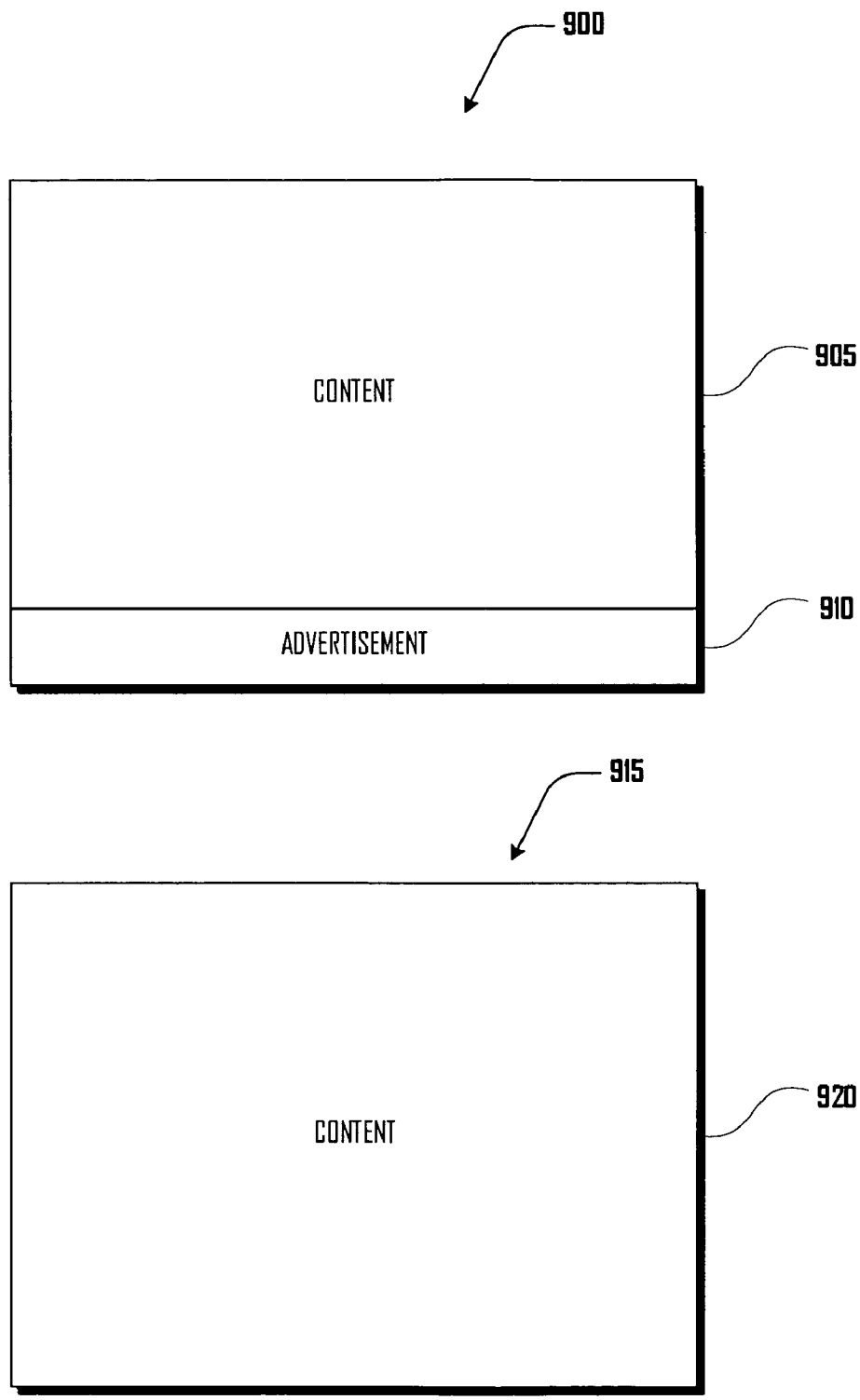
FIG. 9 is a pictorial diagram of an enhancement layer removing an advertisement in a base layer in accordance with various embodiments.

In one exemplary embodiment, illustrated in FIG. 9, the base layer 305 may render to a display 900 including media content 905 and one or more pieces of advertising content 910 overlaid on or replacing parts of the content 905. A subsequent layer may enhance the base layer by removing, obscuring, resizing, replacing, and/or altering the advertisement. For example, a subsequent layer may render to a display 915 with only content 920 and no advertising.

Figure 10:
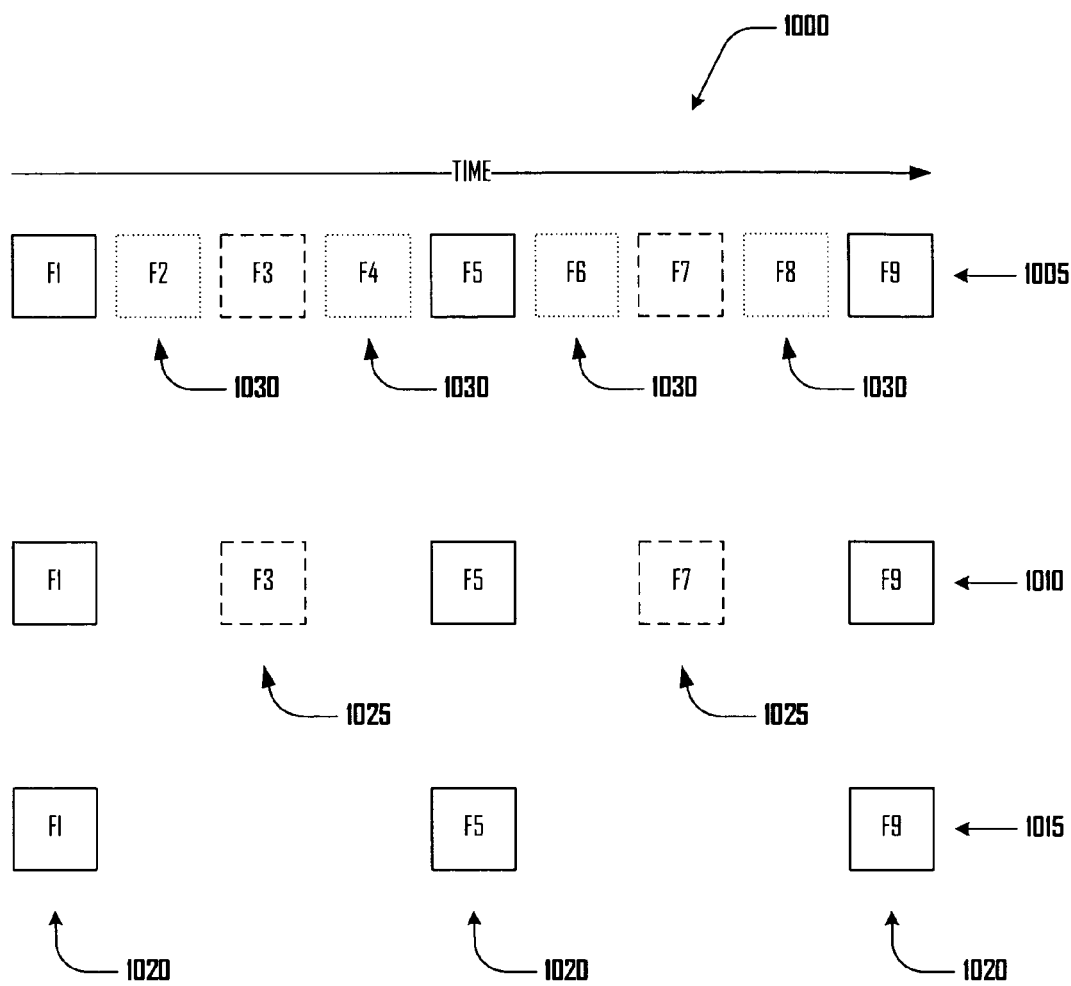
FIG. 10 is a pictorial diagram illustrating enhancement layers providing increased temporal resolution in accordance with various embodiments.

As illustrated in FIG. 10, the temporal resolution (e.g., frame rate or sample rate) may be enhanced by enhancement layers. As illustrated, the original source material was video at 30 frames per second ("fps"). The base layer 1020 includes every fourth frame, and can be viewed on its own at 7.5 fps 1015. A secondary layer 1025 includes some of the frames missing from the base layer 1020. The secondary layer 1025 may be combined with the base layer 1020 and viewed at 15 fps 1010. The tertiary layer 1030 may be combined with the base layer 1020 and secondary layer 1025, and viewed at 30 fps 1005. The illustrated technique can be adapted to other embodiments beyond the example illustrated in FIG. 10.

In some embodiments, secondary and/or tertiary layers 1025, 1030 may be independently renderable without reference to the base layer 1020. For example, in the illustrated example, the tertiary layer 1030 may be renderable on its own (without reference to either the base 1020 or secondary 1025 layers). In the illustrated example, the tertiary layer 1030 may be independently renderable at 15 fps. In various embodiments, enhancement layers may also be independently renderable if they provide improvements other than improved frame rate. For example, an enhancement layer that provides an audio track may be independently renderable as a sound file. Similarly, an enhancement layer that provides improved SNR may be independently renderable. The same applies to layers that provide other types of enhancements.

Figure 11:
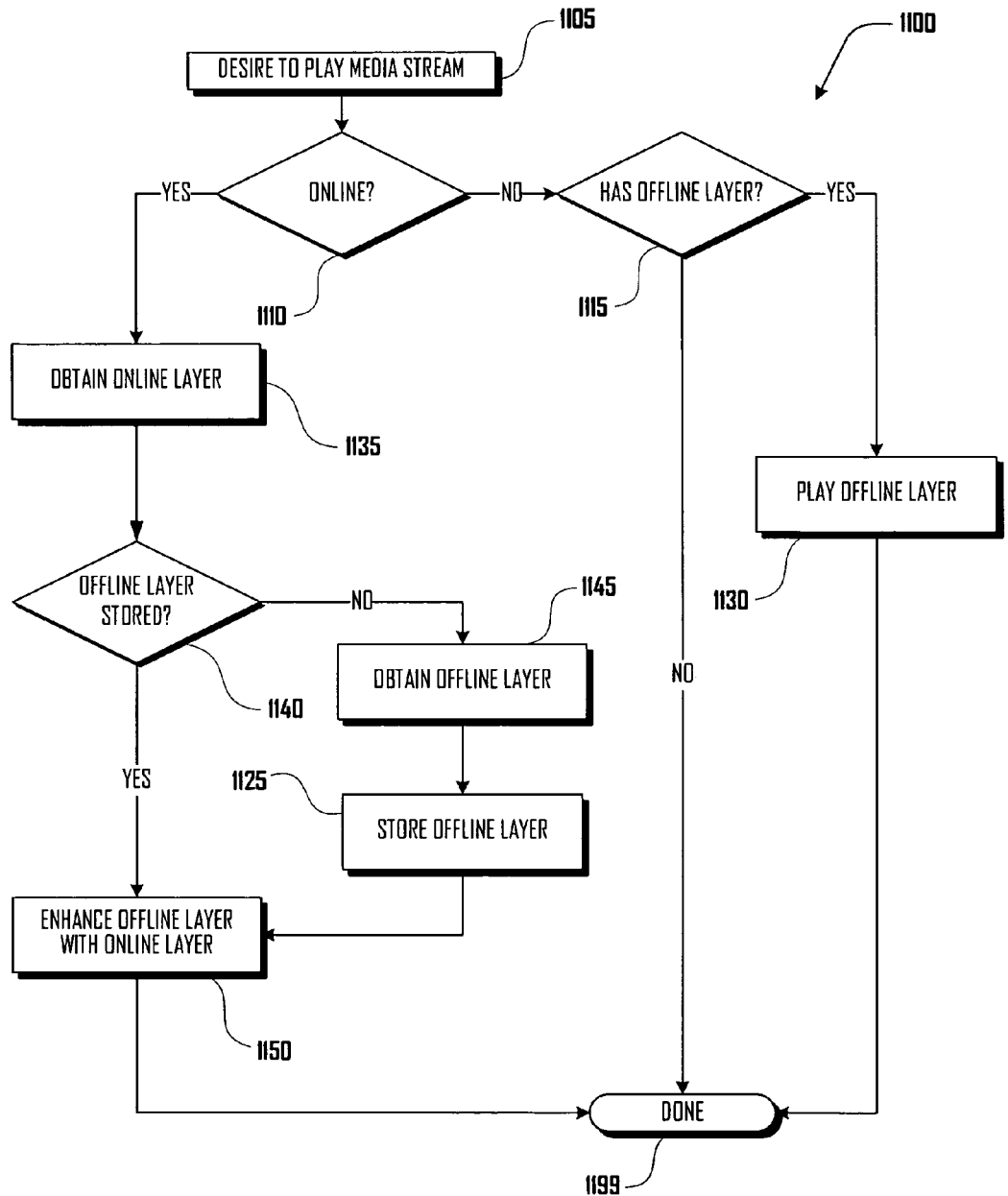
FIG. 11 is a flow diagram illustrating a routine for playing online enhanced layered media in accordance with various embodiments.

FIG. 11 illustrates a routine for playing an online-enhanced layered media stream in accordance with one embodiment. At block 1105, a playback device obtains an indication to play a layered media stream, wherein one of the layers provides online enhancements. (For example, one layer may provide a resolution suitable for an online mobile device.) At decision block 1110, the device determines whether it is online. If it is, the routine 1100 proceeds to block 1135, where an online layer is requested from a hosting device, typically either a managed server or a peer on a P2P network. In block 1140, the device determines whether it already has a stored copy of the offline layer. If not, the device obtains the offline layer, typically from the same host device, in block 1145. In block 1125, the device stores the offline layer so that at least the offline layer can be played when the device is offline. In block 1150, the device plays back the offline layer, enhanced by the online layer, after which routine 1100 ends at block 1199.

If the device is not online, the routine proceeds to decision block 1115, in which it determines whether it already has a stored copy of the offline layer. If not, the media stream cannot be played and the routine ends at block 1199. If the device does have a stored copy of the offline media, it can play the offline layer at block 1130, after which the routine ends at block 1199.

Figure 12:
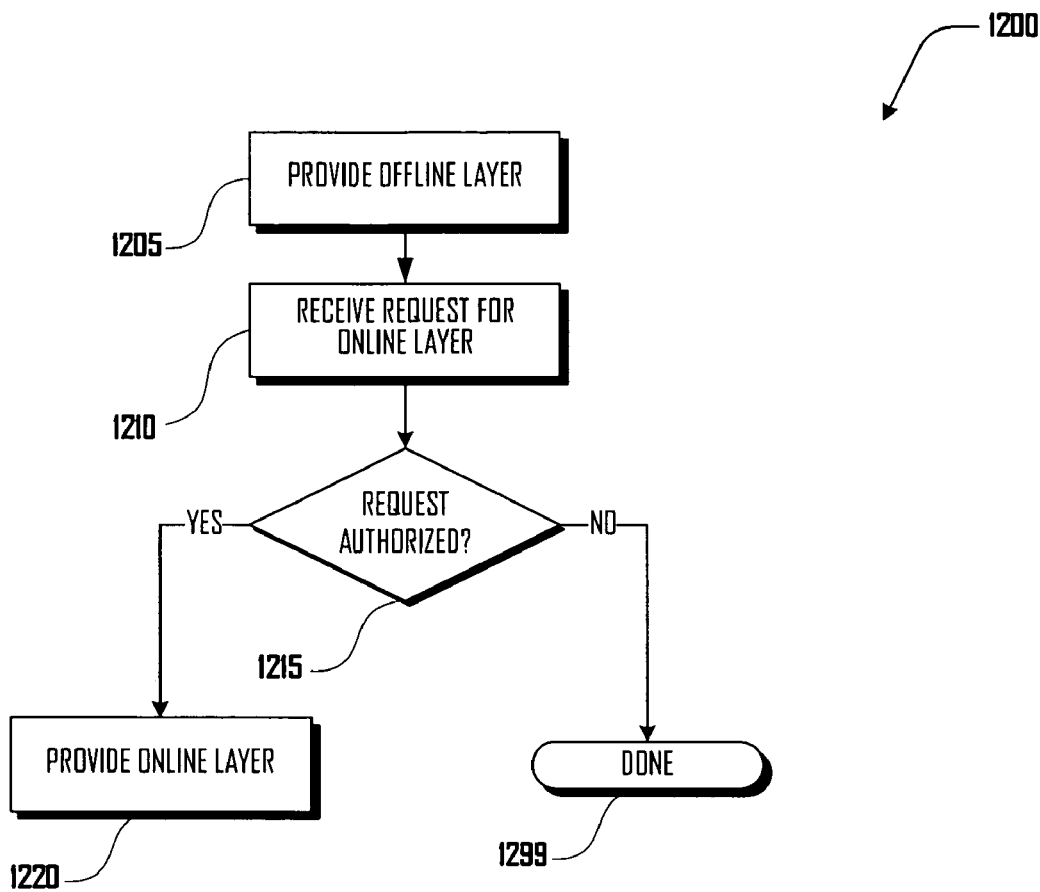
FIG. 12 is a flow diagram illustrating a routine for providing online enhanced layered media in accordance with various embodiments.

FIG. 12 illustrates an alternate embodiment, wherein the offline layer is not playable on its own. For example, the offline layer may provide an enhancement that requires too much bandwidth to transfer to a playback device, e.g., a mobile phone, on a low bandwidth network. The offline layer may be provided when the mobile device is docked to a higher bandwidth connection. But rather than providing the entire media stream, a low bandwidth base and/or decryption layer may be streamed to the device in real time so that, for example, a hosting device may verify that playback is authorized. In block 1205, a host device provides a client with an offline layer. At block 1210, possibly when the playback device is on a low bandwidth connection, the host device receives a request for the online layer. In block 1215, the host device determines whether the playback device is currently authorized to play the stream. If not, the host does not provide the online (base) layer, and the routine ends 1299, the playback device being unable to play the layered media stream. If the playback device is authorized, the host device provides the online layer, and the playback device can play the layered media stream in block 1220, after which the routine 1200 ends in block 1299.

This embodiment is intended to depict an exemplary embodiment only, and one reasonably skilled in the art and others will appreciate that other embodiments can involve other types of layered and/or variable fidelity media as described herein.

Although specific embodiments have been illustrated and described herein, it will be appreciated by those of ordinary skill in the art and others, that a wide variety of alternate and/or equivalent implementations may be substituted for the specific embodiment shown in the described without departing from the scope of the present invention. This application is intended to cover any adaptations or variations of the embodiment discussed herein. Therefore, it is manifested and intended that the invention be limited only by the claims and the equivalents thereof. While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined by reference to the claims that follow.

The invention claimed is:

1. A method of distributing a layered media stream via a managed server and a peer-to-peer network, the method comprising:
    hosting, by the managed server, a media content stream comprising a plurality of media information layers, wherein at least two combinable layers of said plurality of media information layers may be combined into a renderable bitstream, and wherein layers in combination comprise an improvement to the renderable bitstream;
    receiving by the managed server a request from a client for said media content stream, wherein said client is currently eligible to receive via a plurality of sources said at least two combinable layers, but wherein said client is currently eligible to receive from the managed server only a subset of said combinable layers, said client being ineligible to receive from the managed server at least an ineligible one of said combinable layers;
    making said subset of said combinable layers available to a client from the managed server; and
    making said ineligible one of said combinable layers available from the managed server to a distribution peer within the peer-to-peer network so as to make said ineligible one of said combinable layers available to said client and other peers within the peer-to-peer network from said distribution peer.

2. The method of claim 1, wherein said subset of said combinable layers are independently renderable.

3. The method of claim 2, wherein said ineligible one of said combinable layers comprises an improvement to said subset of said combinable layers only in combination with said subset of said combinable layers.

4. The method of claim 1, wherein said ineligible one of said combinable layers is made available only to said distribution peer.

5. The method of claim 4, further comprising notifying a client that said ineligible one of said combinable layers is available through participation in the peer-to-peer network.

6. The method of claim 1, further comprising making available said ineligible one of said combinable layers from the managed server to a client that is not a distribution peer.

7. The method of claim 6, wherein said client paid a fee for access to said ineligible one of said combinable layers.

8. The method of claim 1, wherein said subset of said combinable layers are independently renderable.

9. The method of claim 1, wherein said improvement comprises a variation in at least one of a signal-to-noise ratio, a bit depth, an encoding format, a spatial resolution, and a temporal resolution.

10. The method of claim 1, wherein said subset of said combinable layers comprises an advertisement and said at least one additional layer provides an improvement comprising at least one of removing, obscuring, resizing, replacing, and altering said advertisement.

11. The method of claim 1, further comprising making available said ineligible one of said combinable layers to peers within the peer-to-peer network in accordance with past activity as a distribution peer.

12. The method of claim 1, wherein said ineligible one of said combinable layers comprises a decryption key.

13. The method of claim 1, wherein said managed server acts as said distribution peer.

14. The method of claim 1, wherein a peer comprises a selected one of mobile phone, personal digital assistant, set-top box, game console, portable media player, and personal computer.

15. A non-transient computer readable medium having stored thereon instructions that, when executed, perform the method of claim 1.

16. A computer apparatus having a processor and memory containing computer executable instructions that, when executed by the processor, perform the method of claim 1.

17. A method of distributing a layered media stream via a managed server and a peer-to-peer network, the method comprising:
    hosting a media content stream comprising a plurality of media information layers, wherein at least two combinable layers of said plurality of media information layers may be combined into a renderable bitstream, and wherein additional layers in combination comprise an improvement to the renderable bitstream;

receiving by the managed server a request from a client for said media content stream, wherein said client is currently eligible to receive via a plurality of sources said at least two combinable layers, but wherein said client is currently eligible to receive from the managed server only a subset of said combinable layers, said client being ineligible to receive from the managed server at least an ineligible one of said combinable layers;

making said subset of said combinable layers available from the managed server to a plurality of clients without regard for their participation in the peer-to-peer network;

notifying said plurality of clients by the managed server that at least one peer-distributed layer of said media content stream is available to clients that participate in the peer-to-peer network; and making said ineligible one of said combinable layers available from the managed server to a distribution peer within the peer-to-peer network so as to make said ineligible one of said combinable layers available to other peers within the peer-to-peer network from said distribution peer.

18. The method of claim 17, wherein said improvement comprises a variation in at least one of a signal-to-noise ratio, a bit depth, a spatial resolution, and a temporal resolution, such that said improved renderable bitstream is suitable for rendering on a mobile device.

19. The method of claim 18, wherein said additional layers are suitable for rendering on a mobile device.

20. The method of claim 17, further comprising making available said ineligible one of said combinable layers from the managed server to a client that is not a distribution peer.

21. The method of claim 20, wherein said client paid a fee for access to said ineligible one of said combinable layers.

22. The method of claim 17, wherein said ineligible one of said combinable layers is made available only to said distribution peers.

23. The method of claim 17, further comprising making available said ineligible one of said combinable layers to peers within the peer-to-peer network in accordance with past activity as a distribution peer.

24. The method of claim 17, wherein a peer comprises a selected one of mobile phone, personal digital assistant, set-top box, game console, portable media player, and personal computer.

25. A non-transient computer readable medium having stored thereon instructions that, when executed, perform the method of claim 17.

26. A computer apparatus having a processor and memory containing computer executable instructions that, when executed by the processor, perform the method of claim 17.

27. A non-transient computer readable medium having stored thereon instructions that, when executed by a client computer, are operative to:

request from a server a media content stream comprising a plurality of media information layers, wherein at least two combinable layers of said plurality of media information layers may be combined into a renderable bitstream, and wherein additional layers in combination comprise an improvement to the renderable bitstream;

obtain at least one subset of said combinable layers from said server;

receive a notification from said server that at least one ineligible one of said combinable layers is available via the peer-to-peer network;

in response to receiving said notification, request and obtain said ineligible one of said combinable layers from a distribution peer in the peer-to-peer network, wherein said client is currently eligible to receive via a plurality of sources said at least two combinable layers, but wherein said client is currently eligible to receive from said distribution peer in the peer-to-peer network only a subset of said combinable layers, said client being ineligible to receive from said distribution peer in the peer-to-peer network at least an ineligible one of said combinable layers;

make said ineligible one of said combinable layers available to other peers within the peer-to-peer network; and render to an output device a media content stream derived from said subset of said combinable layers and said ineligible one of said combinable layers.

28. The non-transient computer readable medium of claim 27, wherein said server is said distribution peer.

29. The non-transient computer readable medium of claim 27, wherein said distribution peer obtained said ineligible one of said combinable layers from said server.

30. The non-transient computer readable medium of claim 27, wherein said server is a network service provider.

31. A non-transient computer readable medium having stored thereon instructions that, when executed, perform the method of claim 27.

32. A non-transient computer apparatus having a processor and memory containing computer executable instructions that, when executed by the processor, perform the method of claim 27.

33. A method of adaptively distributing a layered media stream via a managed server and a peer-to-peer network, the method comprising:

hosting a media content stream comprising a plurality of media information layers, wherein at least two combinable layers of said plurality of media information layers may be combined into a renderable bitstream, and wherein additional layers in combination comprise an improvement to the renderable bitstream;

receiving by the managed server a request from a client for said media content stream, wherein said client is currently eligible to receive via a plurality of sources said at least two combinable layers, but wherein said client is currently eligible to receive from the managed server only a subset of said combinable layers, said client being ineligible to receive from the managed server at least an ineligible one of said combinable layers;

making said subset of said combinable layers available from the managed server to a plurality of clients without regard for their participation in the peer-to-peer network;

while a demand fulfillment condition is met:
    making said ineligible one of said combinable layers available from the managed server to a plurality of clients without regard for their participation in the peer-to-peer network; and while said demand fulfillment condition is not met:
    making said ineligible one of said combinable layers available from the managed server only to a plurality of distribution peers within the peer-to-peer network so as to make said ineligible one of said combinable layers available to other peers within the peer-to-peer network from said plurality of distribution peers.

34. The method of claim 33, wherein a plurality of said other peers within the peer-to-peer network are distribution peers, such that another of said other peers within the peer-to-peer network may obtain said ineligible one of said combinable layers from a first distribution peer that obtained said ineligible one of said combinable layers from a second distribution peer.

35. The method of claim 34, wherein the number of distribution peers from which said ineligible one of said combinable layers is available varies in proportion to overall demand for said ineligible one of said combinable layers.

36. The method of claim 33, wherein said demand fulfillment condition comprises at least one of a minimum network bandwidth availability threshold and a maximum number of layer requests threshold.

37. A non-transient computer readable medium having stored thereon instructions that, when executed, perform the method of claim 33.

38. A computer apparatus having a processor and memory containing computer executable instructions that, when executed by the processor, perform the method of claim 33.

39. A method of distributing a layered media stream, the method comprising:
 hosting a media content stream comprising a plurality of media information layers, wherein at least two combinable layers of said plurality of media information layers may be combined into a renderable bitstream, and wherein additional layers in combination comprise an improvement to the renderable bitstream;
 receiving by the managed server a request from a client for said media content stream, wherein said client is currently eligible to receive via a plurality of sources said at least two combinable layers, but wherein said client is currently eligible to receive from the managed server only a subset of said combinable layers, said client being ineligible to receive from the managed server at least an ineligible one of said combinable layers;
 making said subset of said combinable layers available to a plurality of clients without regard for their participation in the peer-to-peer network;
 while a demand fulfillment condition is met:
  making said ineligible one of said combinable layers available to a plurality of clients without regard for their participation in the peer-to-peer network; and
 while said demand fulfillment condition is not met:
  making said subset of said combinable layers available to a plurality of distribution peers within the peer-to-peer network so as to make said subset of said combinable layers of said media content stream available to other peers within the peer-to-peer network from said plurality of distribution peers;
  making said ineligible one of said combinable layers available only to a plurality of distribution peers within the peer-to-peer network so as to make said ineligible one of said combinable layers available to other peers within the peer-to-peer network from said plurality of distribution peers; and
  notifying said plurality of clients that said ineligible one of said combinable layers is available to clients that participate in the peer-to-peer network.

40. The method of claim 39, wherein a plurality of said other peers within the peer-to-peer network are distribution peers, such that another of said other peers within the peer-to-peer network may obtain said ineligible one of said combinable layers from a first distribution peer that obtained said ineligible one of said combinable layers from a second distribution peer.

41. The method of claim 40, wherein the number of distribution peers from which said ineligible one of said combinable layers is available varies in proportion to overall demand for said ineligible one of said combinable layers.

42. The method of claim 39, wherein said demand fulfillment condition comprises at least one of a minimum network bandwidth availability threshold and a maximum number of layer requests threshold.

43. A non-transient computer readable medium having stored thereon instructions that, when executed, perform the method of claim 39.

44. A computer apparatus having a processor and memory containing computer executable instructions that, when executed by the processor, perform the method of claim 39.

* * * * *